July 7, 1959
E. R. BURTNETT
2,893,265
POWER TRANSMITTING MECHANISM
Filed April 6, 1956
2 Sheets-Sheet 1
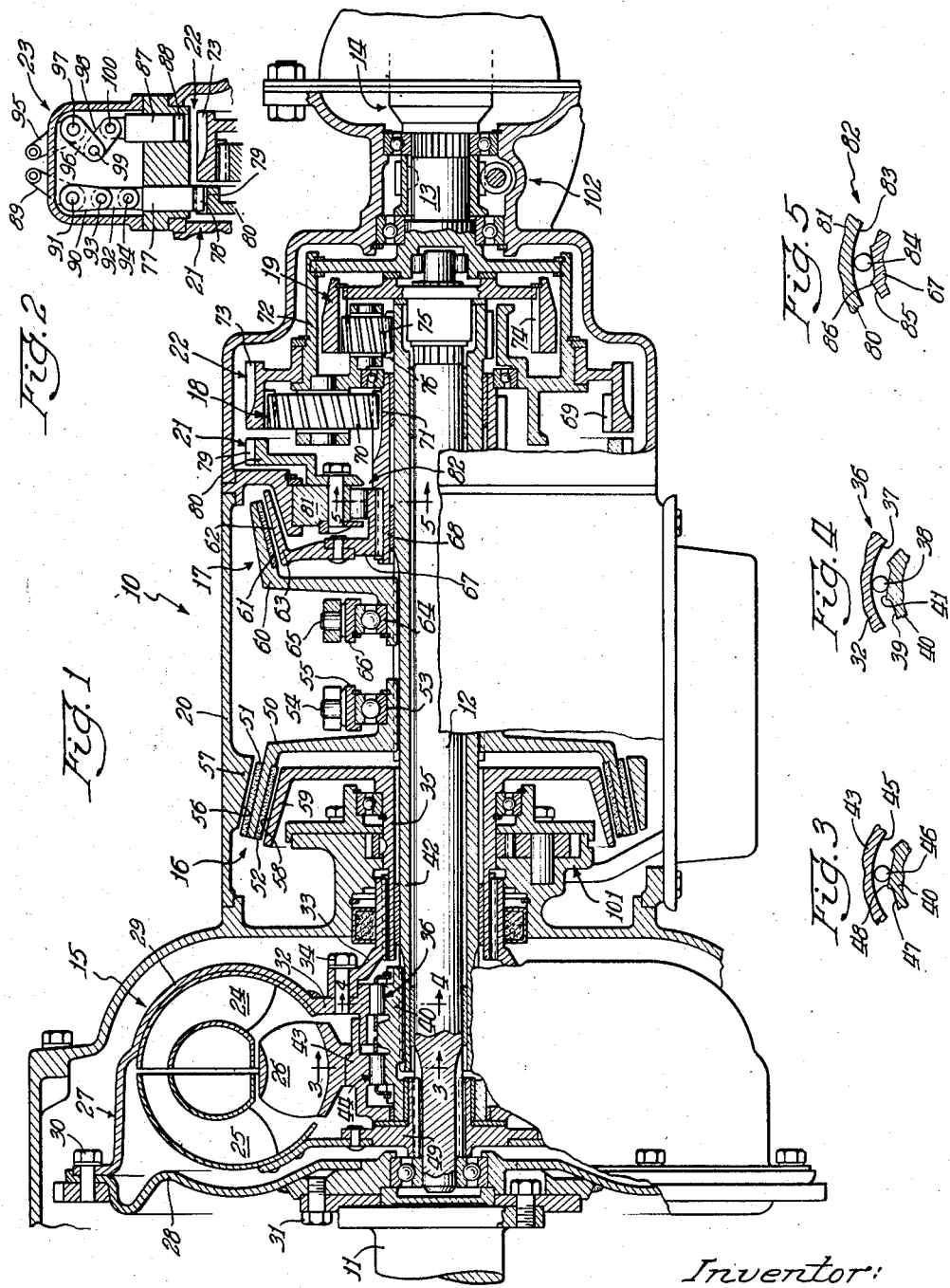
Inventor:
Everett R. Burtnett
By: Keith J. Blews
Atty.

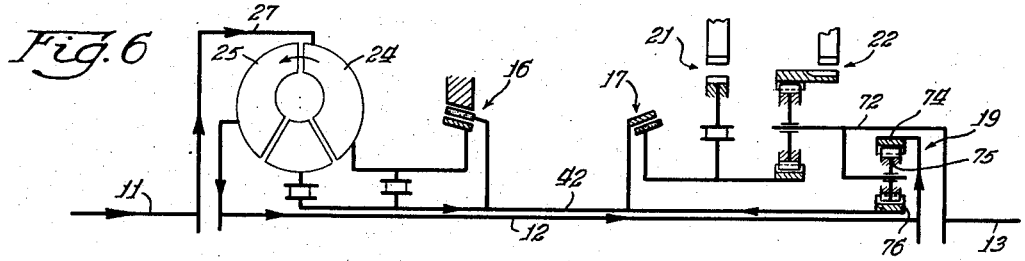
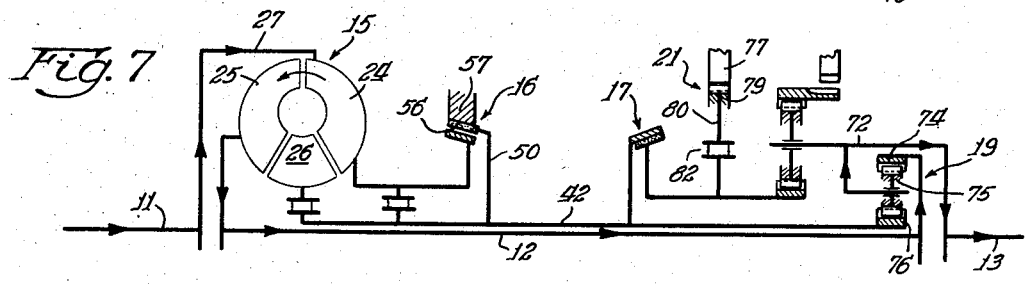
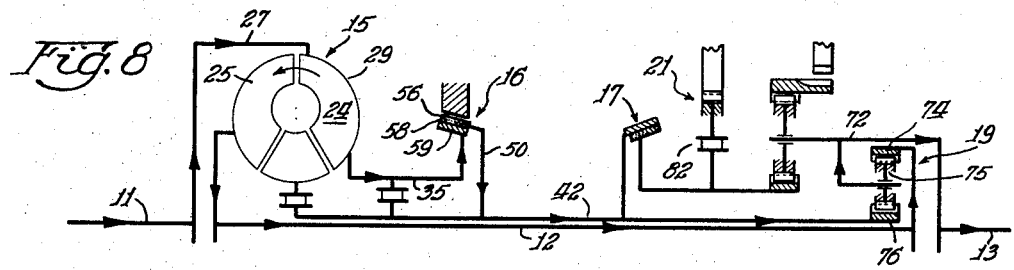
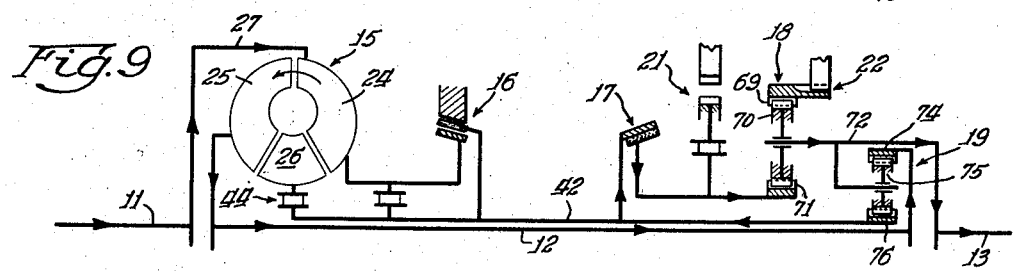
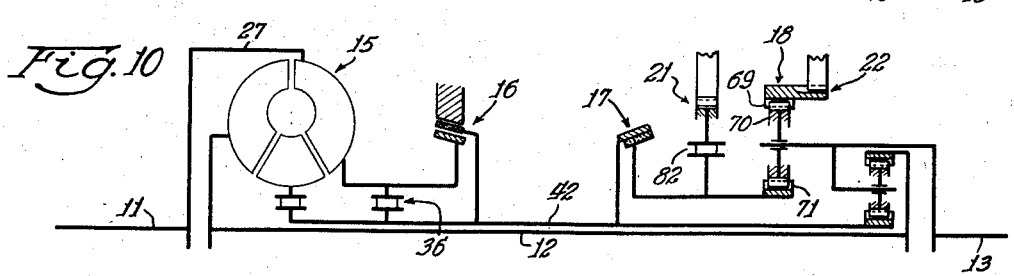

United States Patent Office 2,893,265
Patented July 7, 1959

2,893,265
POWER TRANSMITTING MECHANISM

Everett R. Burtnett, China Lake, Calif., assignor to Borg-Warner Corporation, Chicago, Ill., a corporation of Illinois Application April 6, 1956, Serial No. 583,349

(Filed under Rule 47(b) and 35 U.S.C. 118)

4 Claims. (Cl. 74—677)

The invention relates to transmissions for automotive vehicles and particularly to transmissions of the hydraulic torque converter type.

It is an object of the present invention to provide an improved hydraulic torque converter type transmission having a low and a high speed forward drive and a reverse drive; the high speed forward drive being of the two-path type with only one path including the hydraulic torque converter for thereby obtaining a high efficiency for the transmission.

It is contemplated that the transmission shall include planetary gearing, one element of which is braked for completing the reverse drive and another element of which is braked for completing the low speed forward drive. It is an object to utilize a positive type brake in series with a one-way brake so that the low speed forward drive power train may be a one-way drive. It is also an object to provide a friction brake in parallel with the forward drive positive brake so that the low speed forward drive may optionally be a two-way drive.

It is an additional object to utilize a dual position clutch-brake combination effective for completing a two-way low speed drive when used as a brake and for completing a high speed drive when used as a clutch.

It is another object to so arrange the hydraulic torque converter and planetary gearing that for reverse drive an element of the gearing that rotates reversely is connected with the stator of the hydraulic torque converter so that this element of the gearing takes the reaction from the torque converter stator but at the same time allows the stator to rotate reversely and thus change the characteristics of the hydraulic torque converter for this drive.

It is also an object to provide an improved construction for giving a parked condition of the transmission driven shaft. It is contemplated that both the positive brakes for completing the forward and reverse drive may be engaged to provide this parking condition and which, through the planetary gearing, hold the driven shaft from rotation in the reverse direction when both brakes are engaged. It is a further object to provide a one-way engaging device between an element of the planetary gearing and the drive shaft for completing a power train from the driven shaft to the drive shaft of the transmission when the reverse drive positive brake is engaged for preventing rotation of the driven shaft in the forward direction to complete the parking condition of the transmission.

The invention consists of the novel constructions, arrangements and devices to be hereinafter described and claimed for carrying out the above stated objects and such other objects as will be apparent from the following description of a preferred form of the invention illustrated with reference to the accompanying drawings wherein:

Fig. 1 is a longitudinal sectional view of a transmission which includes forward and reverse drive positive brakes and embodying the principles of the invention;

Fig. 2 is a sectional view of an operating mechanism for the forward and reverse drive positive brakes of the transmission;

Figs. 3, 4 and 5 are sectional views on an enlarged scale taken respectively from lines 3—3, 4—4, and 5—5 ing Fig. 1 in the direction indicated; and Figs. 6, 7, 8, 9 and 10 are diagrams of the transmission illustrated in various conditions, namely, neutral, low speed drive, high speed drive, reverse drive and parking condition, respectively.

Like characters of reference designate like parts in the several views.

Referring to the drawings, the transmission mechanism 10 embodying the principles of the invention is shown as it is used in an automotive vehicle. The transmission mechanism 10 includes a drive shaft 11, an intermediate shaft 12, and a driven shaft 13, all coaxially disposed. A universal joint 14 is fixed on the driven shaft 13. The drive shaft 11 is adapted to be connected to the crank shaft of the vehicle engine, and the universal joint 14 can be of any suitable construction and is adapted to be connected to the driving road wheels of the vehicle through any suitable means (not shown).

The transmission mechanism 10 as a whole comprises a hydraulic torque converter 15, a front cone clutch 16 which also at times acts as a brake, a rear cone clutch 17, a front torque multiplying planetary gear unit 18, and a rear torque multiplying planetary gear unit 19, all enclosed within a casing 20. The transmission mechanism 10 also includes a forward drive positive brake 21, a reverse drive positive brake 22, and an operating mechanism 23 for the forward and reverse drive positive brakes 21 and 22.

The torque converter 15 is of conventional construction and comprises a bladed driving element or impeller 24, a bladed driven element or turbine 25, and a bladed stator 26, all enclosed within a fluid housing 27. The housing 27 has sections 28 and 29 which are fastened together by machine screws 30. The section 28 is also fastened to the drive shaft 11 by machine screws 31. The section 29 is also welded to a hub 32 which is fastened to another hub 33 by means of machine screws 34, and the hub 33 is splined to a sleeve shaft 35. The impeller 24 is integral with the section 29 of the fluid housing 27.

The hub 32 welded to the section 29 forms an external part of a one-way engaging device 36. The engaging device 36 comprises an internal cylindrical surface 37 formed in the hub 32, a plurality of rollers 38 interposed between the surface 37 and an external surface 37 formed in the hub 32, a plurality of rollers 38 interposed between the surface 37 and an external surface 39 formed on an internal hub 40 which has a cam 41 for each of the rollers 38. The hub is splined to a sleeve shaft 42 which is journalled inside of the sleeve shaft 35.

The stator 26 is fastened to a hub 43 which forms an external part of a one-way broke 44. The brake 44 comprises an internal cylindrical surface 45 formed in the hub 43, a plurality of rollers 46 interposed between the surface 45 and an external surface 47 formed on the internal hub 40 which also has a cam 48 for each of the rollers 46.

The turbine 25 is fastened to a hub 49 which is splined to the intermediate shaft 12. The intermediate shaft 12 is journalled inside the concentric sleeve shafts 42 and 35.

The front cone clutch 16 is double acting and comprises a coned clutch plate 50 which is splined for axial movement to the sleeve shaft 42 and has friction facings 51 and 52, a bearing 53 fixed to the plate 50, and a connecting stud 54 formed on a bearing housing 55. The friction facing 51 is adapted to be engaged with an internal conical surface 56 formed in an annular portion 57 of the transmission casing 20. The friction facing 52 is adapted to be engaged with an external conical surface 58 formed on an annular member 59 which is integral with the sleeve shaft 35.

The rear cone clutch 17 comprises a coned plate 60 having a friction facing 61 adapted to engage an external conical surface 62 formed on a correspondingly coned clutch member 63, a bearing 64 fixed to the plate 60, and a connecting stud 65 formed on a bearing housing 66.

The plate 60 is splined for axial movement to the sleeve shaft 42. The coned clutch member 63 is fastened to a hub 67 which is splined to a sleeve shaft 68 journalled about the sleeve shaft 42.

The front planetary gear unit 18 comprises a ring gear 69, a plurality of planet gears 70, and a sun gear 71. The planet gears 70 are in mesh with the ring gear 69 and the sun gear 71 and are carried by a planet carrier 72 which is connected directly to the driven shaft 13. The sun gear 71 is integral with the sleeve shaft 68. The ring gear 69 has external teeth 73 which form a part of the reverse drive positive brake 22, and the ring gear 69 is journalled on the planet carrier 72.

The rear planetary gear unit 19 comprises a ring gear 74, a plurality of planet gears 75, and a sun gear 76. The planet gears 75 are in mesh with the ring gear 74 and the sun gear 76 and are carried by the planet carrier 72 which is common for both planetary gear units 18 and 19. The ring gear 74 is splined to the intermediate shaft 12. The sun gear 76 is integral with the sleeve shaft 42.

The forward drive positive brake 21 comprises a pawl 77 having a tooth 78 thereon which is adapted to engage with external teeth 79 formed on an annular member 80. The annular member 80 is fastened to a hub 81 which forms an external part of a one-way brake 82.

The one-way brake 82 comprises an internal cylindrical surface 83 formed in the hub 81, a plurality of rollers 84 interposed between the surface 83 and an external surface 85 formed on the hub 67. The hub 67 has a cam 86 for each of the rollers 84.

The reverse drive positive brake 22 comprises a pawl 87 having a tooth 88 thereon adapted to engage the external teeth 73 formed on the ring gear 69 of the front planetary gear unit 18.

The part of the operating mechanism 23 for the forward drive positive brake 21 comprises a lever arm 89 located externally of the casing 20, a shorter lever arm 90 within the casing 20 and fastened to the arm 89 by means of a pin 91 rotatably mounted in the casing 20, and a link 92 fastened to the arm 90 by a pin 93 and also fastened to the pawl 77 by a pin 94.

The part of the mechanism 23 for the reverse drive positive brake comprises a lever arm 95 located externally of the casing 20, a shorter lever arm 96 within the casing 20 and fastened to the arm 95 by means of a pin 97 rotatably mounted in the casing 20, and a link 98 fastened to the arm 96 by a pin 99 and also fastened to the pawl 87 by a pin 100.

The transmission mechanism 10 includes a front oil pump 101 and a rear oil pump 102, of any suitable construction. The operation of the transmission mechanism 10 in its various conditions may best be understood by reference to Figs. 6 through 9, inclusive.

The transmission mechanism 10 is in the neutral condition, as shown in Fig. 6, when both of the brakes 21 and 22 are disengaged, the rear cone clutch 17 is disengaged, and the front cone clutch 16 is in its intermediate position, that is out of engagement with either the surface 56 or the surface 58. With the vehicle engine running in this condition, torque delivered by the engine is transmitted through the drive shaft 11, the fluid housing 27, the impeller 24, the turbine 25, and the intermediate shaft 12 to the ring gear 74 of the rear planetary gear unit 19. The planet carrier 72 fixed to the driven shaft 13 is at rest, and the ring gear 74 drives the sun gear 76 in the reverse direction through the planet gears 75. The sun gear 76 and the shaft 42 spin freely, and the torque supplied by the engine is thus dissipated within the transmission mechanism 10.

Low speed forward drive is obtained, as is shown in Fig. 7, when the forward drive positive brake 21 is engaged, the rear cone clutch 17 is engaged, and the front cone clutch 16 is engaged in its brake position, that is, engaged with the surface 56 on the annular portion 57 of the transmission casing 20.

The positive brake 21 is engaged by rotating the lever 89 clockwise, as seen in Fig. 2, so as to move the links 90 and 92 into alignment and thereby move the pawl 77 into engagement with the teeth 79 on the disk 80. The rear cone clutch 17 is engaged by applying a force through the studs 66 and the bearing 64 so as to move the coned plate 60 into contact with the clutch member 63. The cone clutch 16 is engaged by applying a force through the studs 54 and the bearing 53 so as to move the coned plate 50 into contact with the surface 56.

With the front cone clutch 16 thus engaged, it takes reaction for the stator 26 and the sun gear 76 of the rear gear unit 19 through the sleeve shaft 42. In this condition, torque from the engine is transmitted in turn through the drive shaft 11, the fluid housing 27, the impeller 24, the turbine 25, the intermediate shaft 12, the ring gear 74, the planet gears 75, and the planet carrier 72 to the driven shaft 13. The engine torque is multiplied in the torque converter 15 until the converter 15 begins to function as a fluid coupling, and the torque is multiplied again in the rear planetary gear unit 19; the torque converter 15 and gear unit 19 being in series for this condition of the transmission 10.

The torque converter 15, being of conventional construction, has fluid within its housing 27, and the impeller 24 when driven by the drive shaft 11 causes the fluid in the torque converter to flow through its blades by centrifugal force.

The fluid flows against the blades of the turbine 25 and drives the turbine in the forward direction that is, in the same direction as the drive shaft 11 rotates. The fluid flows out of the turbine and against the front surfaces of the blades of the stator 26, and the curvature of these blades is such as to change the direction of flow of the fluid and direct it into the impeller in the same direction in which the impeller is driven. The stator 26 thus takes the reaction of the torque converter 15 and tends to rotate in the reverse direction, so that torque conversion takes place due to the fluid action. When the speed of the turbine 25 reaches a predetermined value, the fluid flowing out of the turbine 25 impinges on the rear surfaces of the stator blades instead of on the front surfaces and thereafter tends to rotate the stator 26 in the forward direction. The unit 15 thereafter functions as a simple fluid coupling in which no torque conversion takes place, and the one-way brake 44 for the stator 26 releases and allows the stator 26 to rotate freely in the forward direction.

The front cone clutch 16, as is apparent, holds the shaft 42 and the sun gear 76 from rotation in either direction; therefore, this low speed drive is a two-way drive, that is, either from the drive shaft to the driven shaft or from the driven shaft to the drive shaft. This drive is particularly useful for mountain driving in which engine braking is desired for holding the vehicle from moving too fast down-grade.

The positive brake 21 may alternately be relied on for taking the reaction for the shaft 42 whenever the plate 50 is out of engagement from the coned surface 56. The pawl 77 brakes the annular member 80 which holds the shaft 42 from reverse rotation through the one-way brake 82 and the engaged rear cone clutch 17. The shaft 11 thus may drive the driven shaft 13 through the low speed power train just described; however, on a tendency of the driven shaft 13 to rotate forwardly, the one-way brake 82 will disengage and allow the vehicle to travel forwardly without engine braking.

The high speed ratio, shown diagrammatically in Fig. 8, is obtained by shifting the plate 50 of the front cone clutch 16 into engagement with the surface 58 on the annular member 59. Assuming that the plate 50 has not been in engagement with the brake surface 56 and the one-way brake 82 and the positive brake 21 have been relied on for completing the low speed forward drive, the one-way brake 82 will simply disengage to brake the low speed power train as soon as the high speed power train is completed by engagement of the cone plate 50 with the cone surface 58. However, if the plate 50 is in engagement with the brake surface 56 to provide the two-way low speed drive, the one-way brake 82, which has not been effective for the low speed drive, will engage while the clutch plate 50 is moving from the brake surface 56 to the cone surface 58, taking the reaction for the sun gear 76 through the engaged rear cone clutch 17 as has been described in connection with the low speed one-way drive.

When the transmission is in high speed ratio, a two path flow of power exists, the torque from the engine splitting at the section 29 of the fluid housing 27. In one path, the torque is transmitted from the housing 27, through the impeller 24, the turbine 25, the intermediate shaft 12, the ring gear 74 and the planet gears 75 to the planet carrier 72. In the second path, the torque is transmitted from the fluid housing 27, through the sleeve shaft 35, the engaged front cone clutch 16, the sleeve shaft 42, the sun gear 76 and the planet gears 75 to the planet carrier 72. The two paths just described recombine in the planet gear carrier 72.

Generally, in the high speed ratio, the torque converter 15 functions as a simple non-torque multiplying fluid coupling. In this condition, the intermediate shaft 12 is essentially in direct drive with the vehicle engine through the converter 15. The sleeve shaft 42 will also be in direct drive with the vehicle engine through the engaged front cone clutch 16. Since the sun gear 76 is integral with the sleeve shaft 42, and the ring gear 74 is splined to the intermediate shaft 12, the rear planetary gear unit 19 will be essentially locked up so that all of its parts rotate as a unit.

Reverse drive is obtained when the transmission 10 is in the condition as shown in Fig. 9. The reverse drive positive brake 22 is engaged; the forward drive positive brake 21 is disengaged; the rear cone clutch 17 is engaged; and the front cone clutch 16 is in its intermediate position. The torque from the engine is transmitted in turn through the drive shaft 11, the fluid housing 27, the impeller 24, the turbine 25, the intermediate shaft 12, the ring gear 74 and the planet gears 75 to the sun gear 76, thereby driving the sun gear 76 in the reverse direction. This reverse rotation of the sun gear 76 is transmitted through the sleeve shaft 42, the engaged rear cone clutch 17, the sun gear 71, the planet gears 70 and the planet carrier 72 to the driven shaft 13, thereby driving the driven shaft 13 in the reverse direction. The ring gear 69 of the front planetary gear unit 18 is held stationary by the reverse drive positive brake 22 thereby taking reaction for the gear unit 18 while the reverse rotation of the sun gear 71 causes the planet carrier 72 to rotate in the reverse direction.

For this reverse drive condition, the two planet gear units 18 and 19 function together as a single planetary gearing system. It will be observed that two elements of the gear unit 19 (the sun gear 76 and the carrier 72) are connected to two elements of the gear unit 18 (the sun gear 71 and the carrier 72 respectively), the third element of the unit 19 (the ring gear 74) is used as the input element of the gearing system and the third element (the ring gear 69) of the gear unit 18 is used for taking the reaction for the gearing system.

The shaft 42, when the reverse drive is effective, rotates reversely; however, it is effective through the one-way brake 44 to prevent unrestricted rotation of the stator 26, and the hydraulic torque converter 15 during the reverse power train thus converts and multiplies torque through it.

A parking gear is obtained as shown in Fig. 10, when the vehicle and engine are at rest, and the positive brakes 21 and 22 are simultaneously engaged, assuming that the rear cone clutch 17 is held engaged by any suitable means such as a spring (not shown).

In this condition, any tendency of the vehicle to move backward will tend to rotate the driven shaft 13 in the reverse direction. Since the ring gear 69 of the planetary unit 18 is locked against rotation by means of the reverse drive positive brake 22, the tendency of the driven shaft 13 to rotate reversely will tend to drive the sun gear 71 reversely, but this reverse rotation will be prevented by means of the engaged one-way brake 82 and the engaged forward drive positive brake 21. Any tendency of the vehicle to move forward will tend to cause forward rotation of the driven shaft 13 which will be transmitted through the front planetary unit 18 tending to drive the sun gear 71 forward, the engaged rear cone clutch 17, the sleeve shaft 42, the one-way engaging device 36, the fluid housing 27, and the drive shaft 11 to the vehicle engine. Thus any forward motion of the vehicle will be arrested by the compression of the engine.

The vehicle engine can be started by pushing the vehicle forwardly when any suitable means (not shown) is provided for establishing direct drive condition; that is by engaging the plate 50 with the surface 58 on the annular member 59, engaging the forward drive positive brake 21 and engaging the rear cone clutch 17. The starting torque for the vehicle engine will be transmitted from the driven shaft 13 to the vehicle engine through the dual path power train described above for the high speed forward drive relation. Since the hydrodynamic unit 15 is required to deliver only a portion of the torque in this condition, the engine will be started when the vehicle attains a relatively low forward speed.

The improved transmission advantageously provides a two-path power flow direct drive with one path including a hydraulic torque converter which may be relied on to provide increased torque, particularly at low speed, but which does not substantially reduce the overall efficiency of the drive. The transmission provides a one-way reduced speed forward drive and includes a dual position friction-clutch which may be utilized for completing a two-way reduced speed forward drive in lieu of that just mentioned.

The reverse drive utilizes planetary gearing which is so arranged that the sun gear element 76 is connected with the stator 26 of the hydraulic torque converter 15 so that the sun gear takes the reaction of the torque converter stator 26 and at the same time allows the stator 26 to rotate in the reverse direction for thereby changing the characteristics of the hydraulic torque converter 15. The transmission advantageously utilizes a minimum number of gears and is economical of manufacture while providing the overall torque converter range required by today's vehicles.

It is to be understood that the invention is not to be limited to the specific constructions and arrangements shown and described, except only insofar as the claims may be so limited, as it will be understood to those skilled in the art that changes may be made without departing from the principles of the invention.

I claim:

1. In a transmission, the combination of a drive shaft, an intermediate shaft, a driven shaft, a hydraulic torque converter having a driving member or impeller and a driven member or turbine and a stator or reaction member, said impeller being connected with said drive shaft and said turbine being connected with said intermediate shaft, a planetary gear system having two sets of planetary gears each set comprising a ring gear and a sun gear and planet gears in mesh with said ring and sun gears and a planet carrier, said carriers being connected together and to said driven shaft, a friction clutch for connecting together said sun gears, said ring gear of one of said gear sets being connected to and driven by said intermediate shaft and a positive brake for said ring gear of the other of said gear sets for taking reaction from the planetary gear system thereby completing a reverse drive through said torque converter and said planetary gear system between said drive shaft and said driven shaft.

2. In a transmission, the combination of a drive shaft, an intermediate shaft, a driven shaft, a hydraulic torque converter having a driving member or impeller and a driven member or turbine and a stator or reaction member, said impeller being connected with said drive shaft and said turbine being connected with said intermediate shaft, a planetary gear system having two sets of planetary gears each set comprising a ring gear and a sun gear and planet gears in mesh with said ring and sun gears and a planet carrier, said carriers being connected together and to said driven shaft, said ring gear of one of said gear sets being connected to and driven by said intermediate shaft, a friction clutch for connecting together said sun gears, one of said sun gears also being connected to said stator of said hydraulic torque converter so that reaction of said stator is taken by the sun gear and a positive type brake for holding said ring gear of the other of said gear sets against rotation thereby taking reaction of said gear system for completing a reverse drive through said torque converter and said planetary gear system between said drive shaft and said driven shaft.

3. In a transmission mechanism for an automotive vehicle having a driving engine, the combination of a drive shaft adapted to be driven by said engine, an intermediate shaft, a driven shaft, torque transmitting means operatively connecting said drive and intermediate shafts, means for providing a forward drive power train between said drive shaft and said driven shaft and including planetary gearing having a plurality of elements a first one of which is connected to be driven by said intermediate shaft, a second one of which is connected to drive said driven shaft, and a positive type brake in series with a one-way brake for taking reaction from a third element of said gearing and rendering the power train effective, means for providing a reverse drive power train between said drive shaft and said driven shaft and including said gearing and a positive type brake for taking reaction from still another element of said gearing and rendering the power train effective, said brakes being effective to lock said gearing and to hold said driven shaft from rotation in the reverse direction when both positive brakes are engaged, and means including the vehicle engine for holding said driven shaft against rotation in the forward direction and including a one-way engaging device connecting an element of said gearing with said drive shaft which renders effective a power train from said driven shaft to said drive shaft when said reverse drive positive brake is engaged.

4. In a transmission mechanism for an automotive vehicle having a driving engine, the combination of a drive shaft adapted to be driven by said engine, an intermediate shaft, a driven shaft, means for providing a forward drive power train between said drive shaft and said driven shaft and including planetary gearing, said planetary gearing system comprising two sets of planetary gears each set having a ring gear and a sun gear and planet gears in mesh with said ring and sun gears and a planet carrier, one of said ring gears being connected to said intermediate shaft to be driven thereby, said carriers being connected together and to said driven shaft, a friction clutch for connecting said sun gears together, a forward drive positive type brake in series with a one-way brake and connected to one of said sun gears directly and to the other of said sun gears through said clutch for taking reaction from the planetary gearing system and completing said train, means for providing a reverse drive power train between said drive shaft and said driven shaft and including a reverse drive positive type brake adapted to lock a ring gear of said planetary gearing system against rotation in either direction and adapted to take reaction from said planetary system, and a one-way engaging device for connecting one of said sun gears to said drive shaft, said positive brakes and said one-way brake and said gear system cooperating to hold said driven shaft from rotation in the reverse direction when both positive brakes are engaged, said reverse drive positive brake cooperating with said gear system and said one-way engaging device and the vehicle engine to prevent said driven shaft from rotating in the forward direction when the vehicle engine is not running.

References Cited in the file of this patent
UNITED STATES PATENTS
2,695,533    Pollard _____ Nov. 30, 1954